W. W. Woodruff,
Bung.
No. 77,154. Patented Apr. 21, 1868.
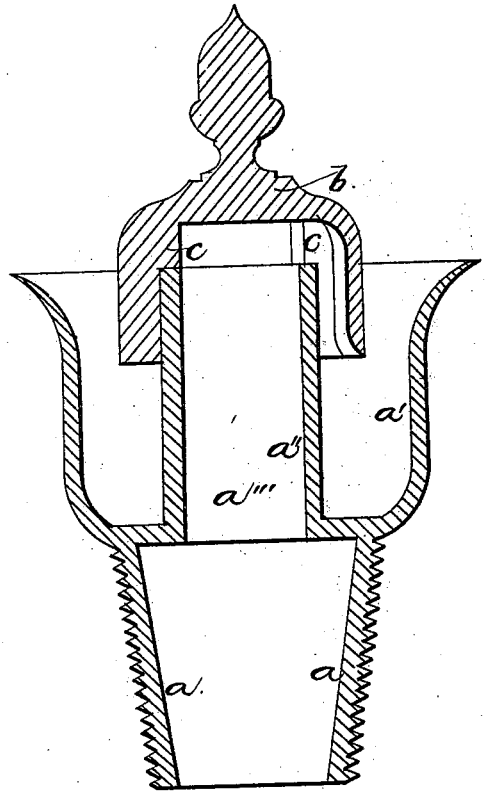
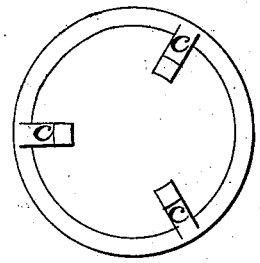
Witnesses:
Inventor:
Wm. W. Woodruff.
N. PETERS, PHOTO-LITHOGRAPHER, WASHINGTON, D. C.

United States Patent Office.

WILLIAM W. WOODRUFF, OF NEW BRITAIN, CONNECTICUT.

Letters Patent No. 77,154, dated April 21, 1868.

IMPROVED FERMENTATION-BUNG.

*The Schedule referred to in these Letters Patent and making part of the same.*

TO ALL WHOM IT MAY CONCERN:

Be it known that I, WILLIAM W. WOODRUFF, of New Britain, county of Hartford, and State of Connecticut, have invented certain new and useful Improvements in Bung-Vent; and to enable others skilled in the art to make and use the same, I will proceed to describe, by referring to the drawings, in which the same letters indicate like parts in each of the figures.

The nature of this invention will be understood from the specification and drawings.

The object desired to be attained thereby, over other devices designed for that purpose heretofore in use, is to render the barrel or vessel perfectly air-tight, (when placed upon stocks for fermentation,) and, at the same time, provide for a free fermentation of the liquid placed in said barrel or vessel, thereby preventing waste of valuable liquor or bursting of vessels.

In the accompanying drawings—

Figure 1 is a section side elevation of my invention.

$a$ is the bung proper, provided with a screw-thread, for the purpose of screwing it into the orifice or hole of a cask or vessel.

$a'$ is a cup formation, which connects with the upper end of said bung.

$a''$ is a tubular formation, extending upward from the bung nearly the whole height of the cup $a'$, the orifice, $a'''$, of which extends through the bung $a$.

$b$ is a cap, which covers the upper end of the tubular formation, and is provided with bosses, $c$, arranged near the bottom thereof, (the cap $b$,) which bosses rest upon the upper edge of the tube $a''$, which prevents the head of the cap from resting upon the upper end of the tube or orifice, and thereby allows a free fermentation of the liquor without admitting the air into the vessel, thereby allowing the liquor to undergo the process of fermentation without the ordinary liability of injury thereto.

I believe I have thus shown the nature, construction, and advantage of this invention so as to enable others skilled to make and use the same therefrom.

What I claim, therefore, and desire to secure by Letters Patent, is—

The bung $a$, cup $a'$, tube $a''$, and cap $b$, constructed and arranged substantially as and for the purpose described.

WM. W. WOODRUFF. [L. S.]

Witnesses:
E. W. BLISS,
JEREMY W. BLISS.